United States Patent [19]

Sumi

[11] Patent Number: 4,855,012

[45] Date of Patent: Aug. 8, 1989

[54] PULL-RAISING MEMBER AND PULL-RAISING UNIT FOR PEELING THIN FILM

[75] Inventor: Sigeo Sumi, Saitama, Japan

[73] Assignee: Somar Corporation, Tokyo, Japan

[21] Appl. No.: 178,152

[22] Filed: Apr. 6, 1988

[30] Foreign Application Priority Data

Apr. 6, 1987 [JP] Japan ............................... 62-85209

[51] Int. Cl.$^4$ ............................................ B32B 31/18
[52] U.S. Cl. .................................... 156/584; 156/344; 156/523
[58] Field of Search ............... 156/254, 268, 344, 584, 156/523

[56] References Cited

U.S. PATENT DOCUMENTS 3,727,815  4/1973  Schwartz ...................... 156/584 X
4,274,676  6/1981  Chaper ......................... 156/584 X Primary Examiner—Robert A. Dawson
Attorney, Agent, or Firm—Sughrue, Mion, Zinn, Macpeak & Seas

[57] ABSTRACT

A pull-raising member and pull-raising unit for peeling a thin film from a base plate such as a printed circuit board or the like having an improved average throughout rate. The pull-raising member includes a plurality of pull-raising blades disposed substantially parallel to an end of the thin film. In the pull-raising unit in which the pull-raising member is employed, an elastic member, which is employed to bring the pull-raising blades of the pull-raising member into contact with the base plate, is interposed between the pull-raising member and an attaching member to slide the pull-raising member in such directions as to move into and out of contact with the base plate.

6 Claims, 2 Drawing Sheets

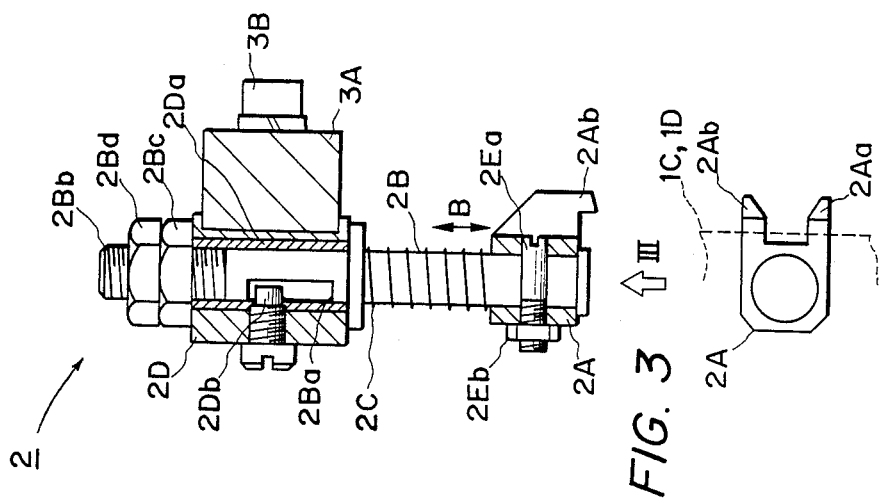
FIG. 2
FIG. 3
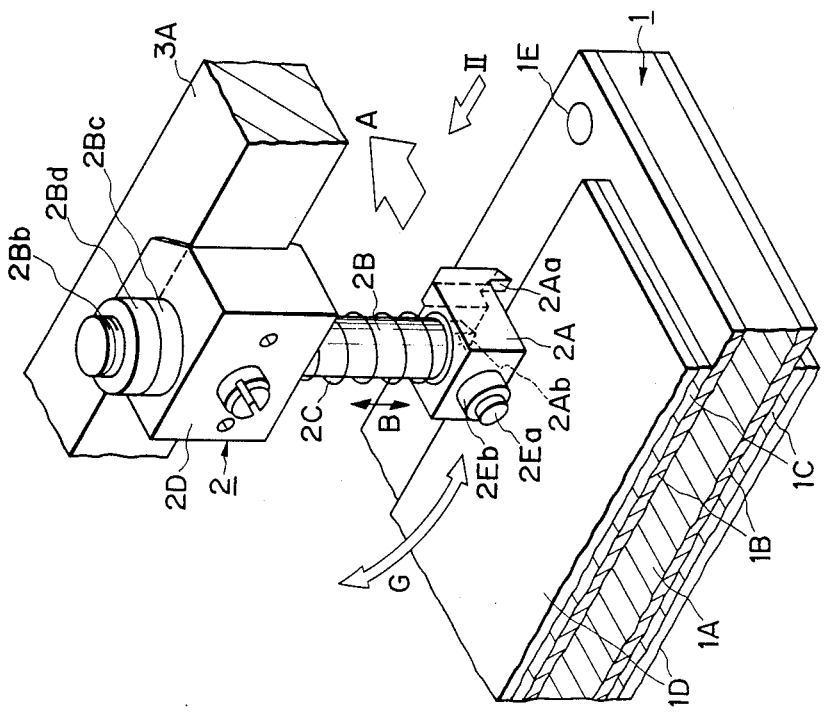
FIG. 1

PULL-RAISING MEMBER AND PULL-RAISING UNIT FOR PEELING THIN FILM

BACKGROUND OF THE INVENTION

The present invention relates to a device for peeling off a thin film, and particularly relates to a device for peeling off a thin film from a base plate.

A printed circuit board, which is used in electronic equipment such as a computer, includes a wiring pattern made of copper or the like formed on one side or both sides of a electrically insulating base plate.

The printed circuit board is manufactured with a process as follows: A stacked assembly of a photosensitive resin (photoresist) layer and a light-transmissible resin film for protecting the photosensitive resin layer is laminated by heat and pressure on an electroconductive layer formed on an electrically insulating base plate. A wiring pattern film is then overlaid on the stacked assembly. The photosensitive resin layer is exposed to light through the wiring pattern film and the light-transmissible resin film for a prescribed time. The light-transmissible resin film is thereafter peeled off. The photosensitive resin layer exposed to light is then developed so that an etching mask pattern is formed. After that, the unnecessary portion of the electroconductive layer is removed by etching. The remaining photosensitive resin layer is then removed to complete printed circuit board.

In such a process of manufacturing the printed circuit board, a step of peeling off the light-transmissible resin film is required before the photosensitive resin layer exposed to the light is developed. Since the light-transmissible resin film is conventionally manually peeled off and the thickness of the film is small, the operator who performs this operation must be highly skilled in order to avoid damaging or destroying the photosensitive resin layer due to peeling stress concentration or the like. For that reason, it is time-consuming to properly peel off the light-transmissible resin film. Therefore, there is a problem in that the work time for the manufacture of the printed circuit board is long.

In order to solve this problem, an automatic thin film peeling device, as disclosed in commonly assigned Japanese Patent Application No. 23178/86, has been developed. The device functions so that the end of a light-transmissible resin film included in a stacked assembly stuck to a base plate is separated by a needle-like projection pusher and a fluid is blown against the separated portion of the film to automatically peel off the light-transmissible resin film.

However, it is difficult to optimally shape the tip (which is used for separating or pull-raising, i.e., simultaneously pulling and raising, the light-transmissible resin film) of the projection pusher of this automatic thin film peeling device. If the tip of the projection pusher has an acute-angled form, the tip tends to damage the light-transmissible resin film or photosensitive resin layer or stick to an electroconductive layer to thus become incapable of peeling off the light-transmissible resin film. On the other hand, if the tip of the projection pusher has a round form, the tip has a tendency to slip on the light-transmissible resin film, making it difficult to positively pull-raise the film to peel it off. Moreover, if the tip of the projection pusher is shaped as a needle, there is a problem in that the tip cannot surely separate or pull-raise the light-transmissible resin film.

Also, since the needle-shaped projection pusher comes into contact with the printed circuit board, the projection pusher is likely to enter a positioning hole provided in the peripheral portion of the printed circuit board (used to overlay the printed circuit board and a wiring pattern film on each other when the photosensitive resin layer is to be exposed to light). If the projection pusher enters a positioning hole, the pusher cannot separate the light-transmissible resin film. In such a case, not only must the continuous peeling of the film be suspended but also the entire thin film peeling process must be halted. For that reason, there is another problem in that the average time per unit taken to peel off the light-transmissible resin film is likely to be high.

SUMMARY OF THE INVENTION

The present invention was made in order to solve the above-mentioned problems.

Accordingly, it is an object of the present invention to provide a thin film peeling device in which the end of a thin film stuck to a base plate is positively pull-raised therefrom.

It is another object of the present invention to provide such a device with which the end of a thin film stuck to a base plate is positively pull-raised therefrom and the average time required to peel the thin film off the base plate is shortened.

It is still another object of the present invention to provide such a device with which the end of a thin film stuck to a base plate is positively pull-raised therefrom, the average time required to peel the thin film off the base plate is shortened, and the base plate, the thin film, etc., are prevented from being damaged or destroyed.

Various aspects of the present invention disclosed herein are discussed below.

One characteristic feature of the invention a pull-raising member for pull-raising the end of a thin film stuck to a base plate which is used to peel the thin film off the base plate, wherein a plurality of pull-raising blades are disposed substantially parallel to the end of the thin film.

Another characteristic feature of the invention relates to a pull-raising unit for pull-raising the end of a thin film stuck to a base plate, which is to used peel the thin film off the base plate, wherein a pull-raising member having a plurality of pull-raising blades disposed substantially parallel to the end of the thin film, and an elastic member, which acts in such a direction and to bring the pull-raising blades of the pull-raising member into contact with the base plate, is interposed between the pull-raising member and an attaching member to slide the pull-raising member in such directions as to move into and out of contact with the base plate.

Since the end of the thin film is pull-raised at a plurality of portions at its end through the line contact of the pull-raising blades of the pull-raising member, the thin film is positively pull-raised from the base plate without being damaged or destroyed.

Even if the position of one of the pull-raising blades of the pull-raising member and a positioning hole in the base plate coincide with each other, the other pull-raising blade serves to prevent the former pull-raising blade from entering the positioning hole. For that reason, the movement of the base plate does not need to be stopped for such reasons, and hence the time required to peel the thin film off the base plate is shortened.

Since the shock which occurs when the pull-raising blades of the pull-raising member are brought into contact with the end of the thin film stuck to the base plate is absorbed by the elastic member, the base plate, the thin film, the pull-raising blades, etc., are prevented from being damaged or destroyed.

BRIEF DESCRIPTION OF THE DRAWINGS

FIG. 1 shows a perspective enlarged view of a major part of a pull-raising unit, which is an embodiment of the present invention, for a protective film peeling device;

FIG. 2 shows a partially sectional view of the major part taken in the direction of an arrow II in FIG. 1;

FIG. 3 shows a bottom view of the major part seen in the direction of an arrow III in FIG. 2;

FIG. 4 shows an enlarged view of the pull-raising blade of the pull-raising unit;

FIG. 5 shows a schematic view of a device for moving the pull-raising unit; and

FIG. 6 shows an enlarged view of the pull-raising blade of a pull-raising unit, which is another embodiment of the present invention, for a protective film peeling device.

DESCRIPTION OF THE PREFERRED EMBODIMENTS

As shown in FIGS. 1, 2 and 3, the pull-raising member 2A of the thin film pull-raising unit 2 is disposed so as to contact with the downstream end (in the direction of conveyance of the printed circuit board 1) of the printed circuit board which is conveyed to a thin film pull-raising position by conveyance rollers (not shown in the drawings). The printed circuit board 1 is composed of an electrically insulating base plate 1A, an electroconductive layer 1B made of copper or the like formed on at least one side of the base plate, and a stacked assembly composed of a photosensitive resin layer 1C and a light-transmissible resin film 1D (which is the protective film) laminated on the electroconductive layer by heat and pressure. The photosensitive resin layer 1C is already exposed to light through a prescribed wiring pattern film overlaid on the photosensitive resin layer. A positioning hole 1E is provided in the peripheral portion of the printed circuit board 1 in an area in which the stacked assembly is not present. A positioning pin for aligning the printed circuit board 1 and the wiring pattern film to expose the photosensitive resin layer 1C to light in a pattern corresponding to the wiring pattern of the wiring pattern film can be inserted into the positioning hole 1E. The printed circuit board 1 is conveyed by the conveyance rollers in the direction of an arrow A shown in FIG. 1.

At least one thin film pull-raising unit 2 is provided near the passage for the conveyance of the printed circuit board 1 with the unit 2 facing at least one of the two sides of the printed circuit board 1. The thin film pull-raising unit 2 includes primarily the pull-raising member 2A, a sliding shaft 2B, an elastic member 2C and an attaching member 2D.

Figures 4, 5, 6:
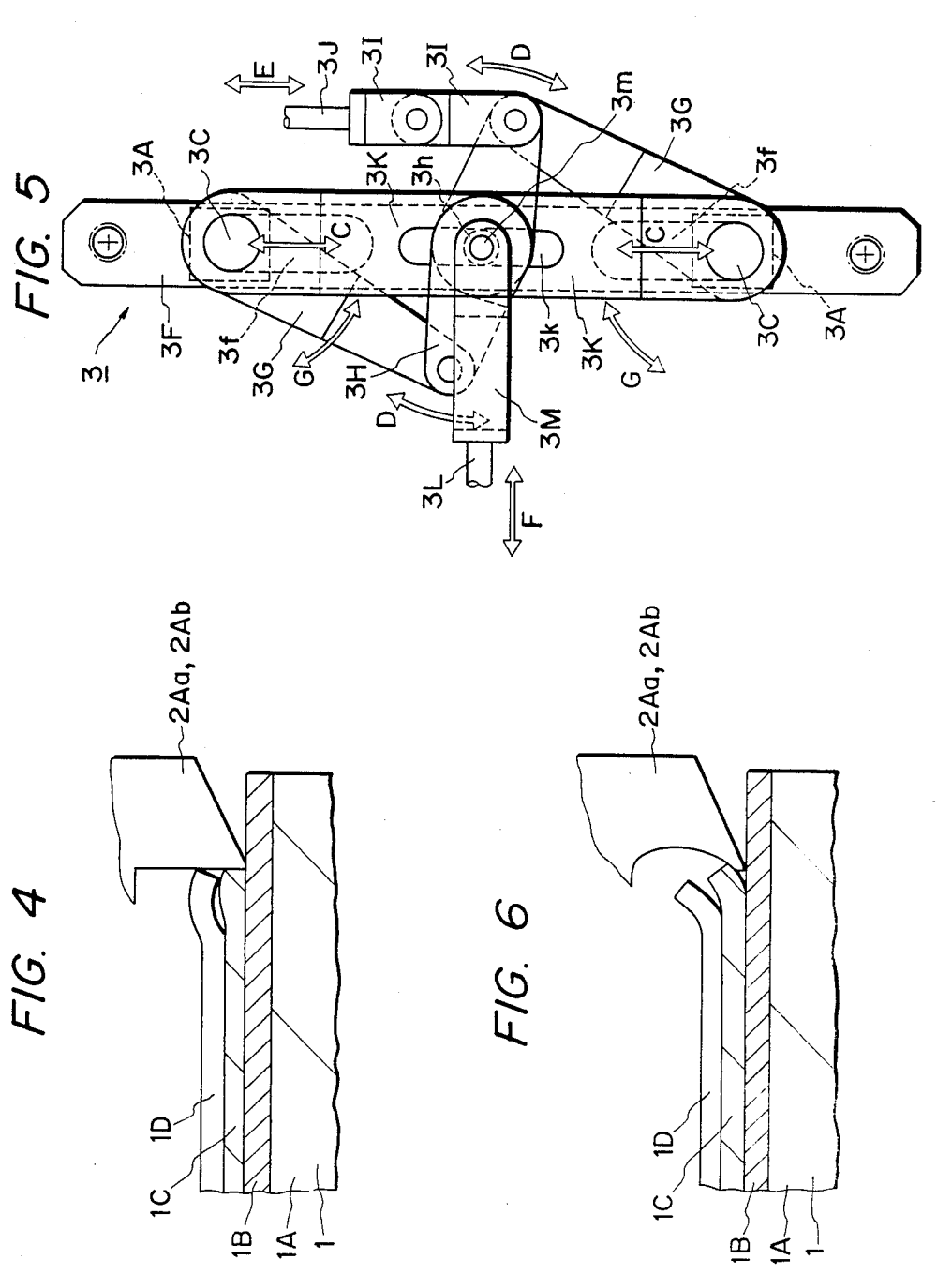

The pull-raising member 2A has two pull-raising blades 2Aa and 2Ab located a predetermined distance from each other and integrally coupled to each other. As shown in FIGS. 3 and 4, the pull-raising surfaces of the pull-raising blades 2Aa and 2Ab are substantially parallel with the end of the stacked assembly at the downstream end of the printed circuit board 1 so that the blades are brought into line contact or surface contact with the photosensitive resin layer 1C and the light-transmissible resin film 1D to apply line pressure or surface pressure to the layer and the film. The line pressure or surface pressure is thus applied to the end of the stacked assembly so that the light-transmissible resin film 1D is pull-raised or peeled off the photosensitive resin layer 1C. Since the photosensitive resin layer 1C and the electroconductive layer 1B adhere to each other more strongly than do the photosensitive resin layer and the light-transmissible resin film 1D, the photosensitive resin layer and the electroconductive layer are not peeled off.

The pull-raising blades 2Aa and 2Ab of the pull-raising member 2A can be made of stainless steel, carbon steel, ceramic or the like so that the blades are highly resistant to wear. The pull-raising member 2A is secured to one end of the sliding shaft 2B by a bolt 2Ea and a nut 2Eb so that the pull-raising member is prevented from rotating.

The sliding shaft 2B is supported with an interposed sleeve 2Da by the attaching member 2D so that the sliding shaft is slidable in such directions (shown by arrows B) as to move the pull-raising blades 2Aa and 2Ab into and out of contact with the printed circuits board 1. The groove 2Ba of the sleeve 2Da and a projecting member 2Db fitted in the groove determine the sliding stroke length of the sliding shaft 2B and prevent it from rotating. The screw-threaded portion 2Bb of the sliding shaft 2B at the other end thereof is fitted with nuts 2Bc and 2Bd to finely adjust the sliding stroke length of the sliding shaft and firmly support the attaching member 2D.

The elastic member 2C, which extends along the sliding shaft 2B between the pull-raising member 2A and the attaching member 2D, is shaped as a coil. The elastic member 2C acts in such a direction as to bring the pull-raising member 2A into contact with the printed circuit board 1 or so as to move the pull-raising member away from the attaching member 2D. The elastic member 2C absorbs shock and applies an appropriate contact force when the pull-raising blades 2Aa and 2Ab of the pull-raising member 2A are brought into contact with the printed circuit board 1.

Since the plurality of pull-raising blades 2Aa and 2Ab which form portions of the pull-raising member 2A are disposed substantially parallel to the end of the stacked assembly to pull-raise the end of the stacked assembly at a plurality of portions of the end thereof simultaneously through the line or surface contact of the blades with the each of the stacked assembly, the light-transmissible resin film 1D is prevented from being damaged or destroyed and is positively pull-raised from the photosensitive resin layer 1C. Even if the position of one of the pull-raising blades 2Aa and 2Ab of the pull-raising member 2A and the position of the positioning hole 1E of the printed circuit board 1 coincide with each other, the other pull-raising blade prevents the former from entering the positioning hole; therefore, the conveyance of the printed circuit board does not need to be stopped for one of the blades entering such a hole. As a result, the average time required per unit to peel the light-transmissible resin film 1D from the printed circuit board 1 is shortened.

Since the pull-raising member 2A having the pull-raising blades 2Aa and 2Ab is provided in the thin film pull-raising unit 2 and the elastic member 2C which acts in a direction so as to bring the pull-raising blades into contact with the printed circuit board 1 is interposed between the pull-raising member and the attaching member 2D to slide the pull-raising member in such directions as to move it into and out of contact with the printed circuit board, the shock which occurs when the pull-raising blades are brought into contact with the end of the stacked assembly is absorbed by the elastic member to prevent the printed circuit board, the stacked assembly, the pull-raising blades, etc., from being damaged or destroyed.

The thin film pull-raising unit 2 is mounted on a pull-raising unit movement mechanism 3 as shown in FIGS. 1, 2 and 5. More specifically, the attaching member 2D of the thin film pull-raising unit 2 is mounted on one of the rotary support shafts 3A of the movement mechanism 3 by a bolt 3B.

The rotary support shafts 3A are disposed in upper and lower positions facing each other across the conveyance passage of the printed circuit board 1. At least one end 3C of each rotary support shaft 3A is rotatably coupled to one end of a moving arm 3G through the slender guide hole 3f of a guide member 3F, as shown in FIG. 5. The guide member 3F is secured to the body of the protective film peeling device by an attachment member (not shown in the drawings) such as a screw. The slender guide hole 3f guides the rotary support shaft 3A for the pull-raising unit 2 in such directions (shown by arrows C in FIG. 5) as to move the pull-raising blades 2Aa and 2Ab into and out of contact with the printed circuit board 1.

The other ends of the upper and the lower moving arms 3G are rotatably attached to the ends of a rotating arm 3H supported rotatably in the direction of an arrow D about a rotary shaft 3h. The rotating arm 3H acts to move the upper and the lower moving arms 3G in the directions of the arrows C. The shaft 3J of a double-sided driver (not shown in the drawings) is connected through a coupling arm 3I to the end of the rotating arm 3H to which the lower or upper moving arm 3G is connected. The double-sided driver may be a pneumatic cylinder, a hydraulic cylinder, a solenoid, etc.

The guide member 3F for guiding the rotary support shaft 3A, the moving arms 3G, the rotating arm 3H and the double-sided driver constitute the vertical movement linkage of the pull-raising unit movement mechanism 3. The vertical movement linkage functions so that the pull-raising blades 2Aa and 2Ab of the thin film pull-raising units 2 provided at both the sides of the printed circuit board 1 are moved toward and away from each other through the action of the shaft 3J in the directions of arrows E. The constituent members of the vertical movement linkage are made of a material such as iron, an aluminum alloy and a hard resin, which material is relatively resistant to deformation by an external force. The shaft 3J does not necessarily need to be coupled to the end of the rotating arm 3H, and may be coupled to the other end thereof or to the moving arm 3G instead.

Pull-raising member rotation arms 3K are secured at one end and disposed at the ends 3C of the rotary support shafts 3A fitted with the moving arms 3G. The pull-raising member rotation arms 3K are provided with slender holes 3k at the other ends of the arms. The shafts 3m of coupling arms 3M connected to the shaft 3L of a double-sided driver (not shown in the drawings) extend through the holes 3k of the pull-raising member rotation arms 3K so that the arms 3K are connected to the shaft 3L of the double-sided driver through the coupling arms 3M. The double-sided driver may again be implemented with a pneumatic cylinder, a hydraulic cylinder, a solenoid, etc.

The pull-raising member rotation arms 3K and the coupling arms 3M constitute the rotation linkage of the pull-raising unit movement mechanism 3. The rotation linkage acts to turn the pull-raising member rotation arms 3K and the rotary support shafts 3A in the directions of arrows G through the action of the shaft 3L in the direction of an arrow F so as to move the pull-raising blades 2Aa and 2Ab of the pull-raising member 2A by a prescribed length, 1 to 3 mm, for example, in the direction opposite to that of the conveyance of the printed circuit board 1. In other words, the rotation linkage acts to bring the pull-raising blades 2Aa and 2Ab into line contact with the end of the stacked assembly and thereafter push the blades to pull-raise a part of the light-transmissible resin film 1D from the photosensitive resin layer 1C. After the light-transmissible resin film 1D is pull-raised at the end of the stacked assembly by the thin film pull-raising unit 2 and the pull-raising unit movement mechanism 3, a pressurized fluid is blown from a fluid ejection nozzle to the pull-raised part of the film 1D so that the film is completely peeled off the photosensitive resin layer 1C. The light-transmissible resin film 1D is thus peeled off the photosensitive resin layer 1C in a simple, instantaneous and positive manner.

The edge angles of the pull-raising blades 2Aa and 2Ab of the pull-raising member 2A of the thin film pull-raising unit 2, which are shown in FIG. 4, may be made more acute, as shown in FIG. 6. If the edge angles of the pull-raising blades 2Aa and 2Ab are made more acute as shown in FIG. 6, the light-transmissible resin film 1D can be more positively peeled off the photosensitive resin layer 1C in a divergent manner at the end of the stacked assembly to make it easier for the pressurized fluid to enter between the pull-raised part of the light-transmissible resin film 1D and the photosensitive resin layer 1C to more surely peel the film off the layer.

The present invention is not confined to the above-described embodiments, and may be embodied in various other ways without departing from the spirit and essential character of the invention. For instance, the pull-raising member 2A of the thin film pull-raising unit 2 may be provide with three or more pull-raising blades.

According to the present invention, a pull-raising member for pull-raising the end of a thin film stuck to a base plate to peel the thin film off the base plate is provided with plurality of pull-raising blades extending substantially parallel to the end of the thin film, so that the end of the thin film is pull-raised at a plurality of portions along its end simultaneously through line contact of the pull-raising blades. For that reason, the thin film is positively pull-raised form the base plate without being damaged or destroyed.

According to the present invention, a pull-raising unit for pull-raising the end of a thin film stuck to a base plate to peel the thin film off the base plate is provided with a pull-raising member having a plurality of pull-raising blades extending substantially parallel to the end of the thin film. An elastic member, which acts in such a direction as to bring the pull-raising blades of the pull-raising member into contact with the base plate, is provided between the pull-raising member and an attaching member to slide the pull-raising member in such directions as to move the pull-raising blades into and out of contact with the base plate. Since a shock which occurs when the pull-raising blades of the pull-raising member are brought into contact with the end of the thin film stuck to the base plate is absorbed by the elastic member, the base plate, the thin film, the pull-raising blades, etc., are prevented from being damaged or destroyed.

What is claimed is:

1. In an apparatus including a pull-raising member (2A) for pull-raising an end of a thin film (1D) adhered to a base plate to peel said thin film off of said base plate, the improvements characterized by: a plurality of pull-raising blades (2Aa, 2Ab) mounted to said pull-raising member and disposed substantially parallel to said end of said thin film, and an elastic member (2C) disposed to act in a direction to urge said pull-raising blades into contact with said base plate.

2. A pull-raising unit (2) for pull-raising an end of a thin film (1D) adhered to a base plate to peel said film off of said base plate, comprising: a pull-raising member (2A) having a plurality of pull-raising blades (2Aa, 2Ab) disposed substantially parallel to said end of said thin film; and an elastic member (2C) disposed to act in a direction to urge said pull-raising blades of said pull-raising member into contact with said base plate, said elastic member being interposed between said pull-raising member and an attaching member (2D) to enable said pull-raising member to slide in such direction as to move said pull-raising member into and out of contact with said base plate.

3. The pull-raising unit according to the claim 2, wherein said attaching member is secured to a rotary support shaft (3A) which moves said pull-raising blades of said pull-raising member in such direction as to come into contact with and move out of contact with said base plate, and which rotates said pull-raising blades in such direction as to pull-raise said thin film from said base plate.

4. An apparatus according to claim 1, wherein said pull-raising member is mounted to one end of a vertically oriented support post (2B), and another, opposite end of said support post is slidably mounted to an attaching member (2D).

5. An apparatus according to claim 4, wherein said thin film is adhered to said base plated via an intermediate film and said base plate is stronger than an adhesive bond between said thin film and said intermediate film.

6. An apparatus according to claim 5, wherein said base plate is electrically insulating and is overlaid with an electroconductive layer (1B) to form a printed circuit board, and said intermediate film is adhered to said electroconductive layer.

* * * * *